United States Patent
Davis, III et al.

(10) Patent No.: US 10,737,908 B2
(45) Date of Patent: Aug. 11, 2020

(54) METHOD AND KIT FOR RETROFITTING ELEVATOR MACHINES WITH THRUST BEARING, AND RETROFITTED ELEVATOR MACHINE

(71) Applicant: OTIS ELEVATOR COMPANY, Farmington, CT (US)

(72) Inventors: Daniel B. Davis, III, Middlefield, CT (US); Robert K. Williams, Tariffville, CT (US); John Eschenbrenner, Canton, CT (US); Gregory M. O'Seep, Simsbury, CT (US); James L. Hubbard, Kensington, CT (US); Martin J. Hardesty, West Hartford, CT (US); Bruce P. Swaybill, Farmington, CT (US); Jesse R. Richter, West Hartford, CT (US); Gary P. Mendrala, West Springfield, MA (US); Patricia Derwinski, Farmington, CT (US); Christopher H. Koenig, Granby, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 646 days.

(21) Appl. No.: 15/359,238

(22) Filed: Nov. 22, 2016

(65) Prior Publication Data

US 2018/0141783 A1 May 24, 2018

(51) Int. Cl.
  *B66B 19/00* (2006.01)
  *B66B 11/04* (2006.01)
  *F16C 19/10* (2006.01)

(52) U.S. Cl.
  CPC .......... *B66B 19/007* (2013.01); *B66B 11/043* (2013.01); *F16C 19/10* (2013.01)

(58) Field of Classification Search
  CPC ....... B66B 19/007; B66B 11/043; F16C 19/10
  See application file for complete search history.

(56) References Cited

U.S. PATENT DOCUMENTS

| | | | |
|---|---|---|---|
| 4,108,280 A | 8/1978 | Eastcott et al. | |
| 4,265,458 A | * 5/1981 | Wheeler | B66B 11/0446 277/560 |

(Continued)

FOREIGN PATENT DOCUMENTS

| | | |
|---|---|---|
| CN | 202364035 U | 8/2012 |
| CN | 102781808 A | 11/2012 |

(Continued)

OTHER PUBLICATIONS

Machine Translation—WO-2013080269-A1 (Year: 2013).*

(Continued)

*Primary Examiner* — Christopher J Besler
*Assistant Examiner* — Christine Bersabal
(74) *Attorney, Agent, or Firm* — Cantor Colburn LLP (57) ABSTRACT

Disclosed is a method for retrofitting an elevator machine with a thrust bearing, including removing, from a bearing stand, a first cover plate, providing access to an end portion of a motor shaft, securing an extension shaft against the end portion of the motor shaft, securing a thrust bearing housing against or axially offset from the bearing stand, positioning a thrust bearing in the bearing housing, wherein an inner race of the thrust bearing is securely positioned against, and axially fixed to, the extension shaft, and an outer race of the thrust bearing is securely positioned against the bearing housing, and securing a second cover plate to the bearing housing.

7 Claims, 7 Drawing Sheets

(56) References Cited

U.S. PATENT DOCUMENTS

| | | | |
|---|---|---|---|
| 4,923,055 | A | 5/1990 | Holland |
| 5,007,505 | A | 4/1991 | Lindegger |
| 5,101,939 | A | 4/1992 | Sheridan |
| 5,944,150 | A | 8/1999 | Hikari |
| 6,146,303 | A | 11/2000 | Wittur et al. |
| 7,104,367 | B2 | 9/2006 | Ferrand et al. |
| 7,195,107 | B2 | 3/2007 | Gauthier et al. |
| 7,273,133 | B2 | 9/2007 | Hisamitsu |
| 7,428,951 | B2 | 9/2008 | Ito |
| 8,752,262 | B2 | 6/2014 | Davis et al. |
| 9,090,435 | B2 * | 7/2015 | Kawakami ............ B66B 11/043 |
| 2012/0153754 | A1 | 6/2012 | Vincent et al. |
| 2016/0265944 | A1 * | 9/2016 | Takiguchi ............ G01D 5/2046 |

FOREIGN PATENT DOCUMENTS

| | | | |
|---|---|---|---|
| CN | 108087429 A | 5/2018 | |
| EP | 1717474 A1 | 11/2006 | |
| EP | 2535305 A1 | 12/2012 | |
| JP | H11335041 A | 12/1999 | |
| JP | 2002020064 A | 1/2002 | |
| JP | 3617771 B2 | 11/2004 | |
| WO | 2005037702 A1 | 4/2005 | |
| WO | 2013080269 A1 | 6/2013 | |
| WO | WO-2013080269 A1 * | 6/2013 | ........... B66B 11/043 |
| WO | 2014193726 A1 | 12/2014 | |

OTHER PUBLICATIONS

English Abstract for JP2002020064A—dated Jan. 23, 2002; 2 pgs.
English Abstract for JP3617771B2—dated Nov. 19, 2004; 1 pg.
English Abstract for JPH11335041A—dated Dec. 7, 1999; 2 pgs.
English Abstract for WO2005037702A1—dated Apr. 28, 2005; 2 pgs.
European Search Report for Application No. 17202815.1-1017; dated Jun. 1, 2018; 7 pgs.
Chinese Patent Office, First Office Action for Application No. 201711165770.1 dated Dec. 26, 2019 (8 pp.).

* cited by examiner

METHOD AND KIT FOR RETROFITTING ELEVATOR MACHINES WITH THRUST BEARING, AND RETROFITTED ELEVATOR MACHINE

BACKGROUND

Elevator systems are useful for carrying passengers between various levels in a building. There are various types of elevator systems. Some are referred to as traction-based systems because of reliance upon traction between a drive sheave and hoisting ropes to move and position the elevator car. Elevator machines in traction-based systems include a motor, drive sheave and a brake. There are a variety of known brake configurations.

Some elevator codes require braking functions that are not provided by older machines. Supplemental brakes can be added to meet such code requirements. One type of supplemental brake is referred to as a rope grabber because it provides a mechanism for clamping onto the roping arrangement. A rope grabber prevents the roping arrangement from moving, which maintains a position of an elevator car within a hoistway.

Rope grabber braking has drawbacks. One drawback is that the rope grabber system needs to be positioned below the elevator machine. This requires taking up space within the hoistway or raising the elevator machine within a machine room for providing adequate spacing for the rope grabber system. Raising elevator machines is very costly, requires adequate clearance in the machine room, and may require new ropes. Such installation is cramped, resulting in limited accessibility for future service. Additionally, some elevator applications exceed the capability of existing available rope grabbing devices, or have other space limitations. Rope grabbers, by applying braking forces directly onto the ropes, increase rope wear.

Other options to meet contemporary regulatory braking requirements include replacing the existing elevator machine with a completely new machine that includes necessary braking capabilities. Such action, however, can be costly and time consuming, and results in wasting otherwise serviceable elevator machinery.

The rotating portion of an elevator machine includes a main shaft assembly supported on bearings. The main shaft bearings are supported in stands or housings on the stationary structure of the machine. The main shaft bearings are arranged to support large radial loads developed by the weight of the motor shaft assembly, the weight of the elevator car 22 (FIGS. 1 and 2) and other loads transmitted to the elevator drive sheave by the roping arrangement 26.

The main shaft bearings may be implemented as sleeve bearings, also known as journal bearings. The main shaft bearings may alternatively be implemented as rolling element bearings, also known as anti-friction bearings.

On some elevator machines, the main shaft bearings allow some amount of axial movement of the main shaft during rotation and operation of the elevator machine. Axial movement of the main shaft may occur in main shaft designs utilizing sleeve bearings and also designs utilizing rolling bearing elements.

When applying certain componentry to the main shaft, for proper operation of the componentry the axial movement of the main shaft must be held at or near to zero. Disc brake componentry, e.g., tolerates zero or near zero axial movement of the main shaft for proper operation.

Innovations have sought to enhance braking of installed elevators by replacing contemporary braking componentry with disc brake componentry. In view of tight tolerances associated with disc brakes, the pending disclosure provides a system that limits axial motion for the main shaft disposed between shaft bearing stands.

BRIEF DESCRIPTION

Disclosed is a method for retrofitting an elevator machine with a thrust bearing, comprising removing, from a bearing stand, a first cover plate, providing access to an end portion of a motor shaft, securing an extension shaft against the end portion of the motor shaft, securing a thrust bearing housing against, or axially offset from, the bearing stand, positioning the thrust bearing in the bearing housing, wherein: an inner race of the thrust bearing is securely positioned against, and axially fixed to, the extension shaft, and an outer race of the thrust bearing is securely positioned against the bearing housing, and securing a second cover plate to the bearing housing.

In addition to one or more of the features described above, or as an alternative, further embodiments may include that the extension shaft includes a first base plate that is secured to the end portion of the motor shaft, and the thrust bearing housing includes a second base plate that is secured against or axially offset from the bearing stand.

In addition to one or more of the features described above, or as an alternative, further embodiments may include that the end portion of the motor shaft and bearing stand are provided with threaded bores to securely position the first and second base plates.

In addition to one or more of the features described above, or as an alternative, further embodiments may include that an outward extending portion of the first base plate includes a shoulder that is a first bearing seat for limiting axial motion of the thrust bearing inner race, and an inward extending portion of the second base plate is a second bearing seat for limiting axial motion of the thrust bearing outer race.

In addition to one or more of the features described above, or as an alternative, further embodiments may include that a retaining nut secured to an end portion of the extension shaft is a third bearing seat for limiting axial motion of the thrust bearing inner race, and the second cover plate has an annular boss, which is a fourth bearing seat for limiting axial motion of the thrust bearing outer race.

In addition to one or more of the features described above, or as an alternative, further embodiments may include that the second cover plate, which includes the annular boss, are is axially spaced from the end portion of the extension shaft.

Further disclosed is a kit for retrofitting an elevator machine with a thrust bearing, wherein: from a bearing stand of the elevator machine, a first cover plate is capable of being removed, providing access to an end portion of a motor shaft, and the kit comprises: an extension shaft, capable of being secured against the end portion of the motor shaft, a thrust bearing housing, capable of being secured against, or axially offset from, the bearing stand, the thrust bearing, capable of being positioned in the thrust bearing housing, wherein: an inner race of the thrust bearing is securely positioned against, and axially fixed to, the extension shaft, and an outer race of the thrust bearing is securely positioned against the thrust bearing housing, and a second cover plate, capable of being secured to the bearing housing.

In addition to one or more of the features described above, or as an alternative, further embodiments may include that the extension shaft includes a first base plate, capable of being secured to the end portion of the motor shaft, and the thrust bearing housing includes a second base plate, capable of being secured to, or axially offset from, the bearing stand.

In addition to one or more of the features described above, or as an alternative, further embodiments may include that the end portion of the motor shaft and bearing stand are capable of being provided with threaded bores and the kit further includes a first bolt to securely connect the first base plate thereto and, either (i) a second bolt, or (ii) an extension rod, to securely connect the second base plate thereto.

In addition to one or more of the features described above, or as an alternative, further embodiments may include that an outward extending portion of the first base plate includes a shoulder that is a first bearing seat capable of limiting axial motion of the thrust bearing inner race, and an inward extending portion of the second base plate is a second bearing seat capable of limiting axial motion of the thrust bearing outer race.

In addition to one or more of the features described above, or as an alternative, further embodiments may include that the kit includes a retaining nut, securable to an end portion of the extension shaft, which is a third bearing seat capable of limiting axial motion of the thrust bearing inner race, and the second cover plate has an annular boss, which is a fourth bearing seat capable of limiting axial motion of the thrust bearing outer race.

In addition to one or more of the features described above, or as an alternative, further embodiments may include that the second cover plate, including the annular boss, when installed in an elevator machine, are axially spaced from the end portion of the extension shaft.

In addition to one or more of the features described above, or as an alternative, further embodiments may include extension rods and a third cover plate, with a first oil seal secured thereto, capable of being secured against the bearing stand, and wherein, the thrust bearing housing includes a second oil seal secured thereto and the thrust bearing housing is capable of being axially offset from the bearing stand with the extension rods.

Additionally disclosed is an elevator machine retrofitted with a thrust bearing, wherein: the machine includes a bearing stand, from which a first cover plate has been removed, providing access to an end portion of a motor shaft, the elevator machine comprising: an extension shaft secured against the end portion of the motor shaft, a thrust bearing housing secured against, or axially offset from, the bearing stand, the thrust bearing positioned in the bearing housing, wherein: an inner race of the thrust bearing is securely positioned against, and axially fixed to, the extension shaft, and an outer race of the thrust bearing is securely positioned against the bearing housing, and a second cover plate secured to the bearing housing.

In addition to one or more of the features described above, or as an alternative, further embodiments may include a third cover plate, with a first oil seal secured thereto, secured against the bearing stand, and wherein, the thrust bearing housing includes a second oil seal secured thereto, and the thrust bearing housing is axially offset from the bearing stand with extension rods.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
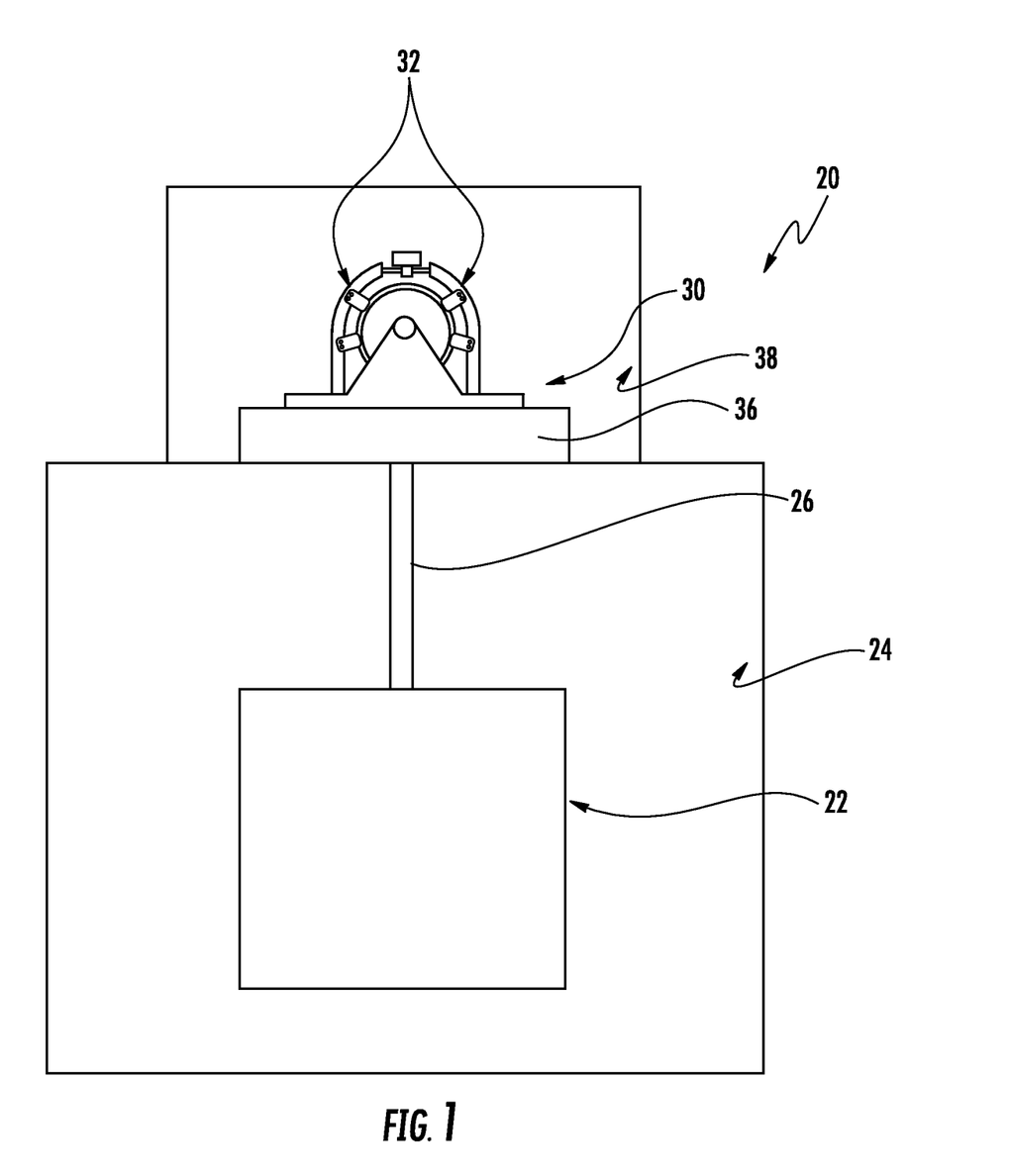
FIG. 1 illustrates an exemplary elevator system.

FIG. 1 schematically shows selected portions of an exemplary elevator system 20. An elevator car 22 is situated for movement within a shaft or hoistway 24. The elevator car 22 is supported by a roping arrangement 26.

Figure 2:
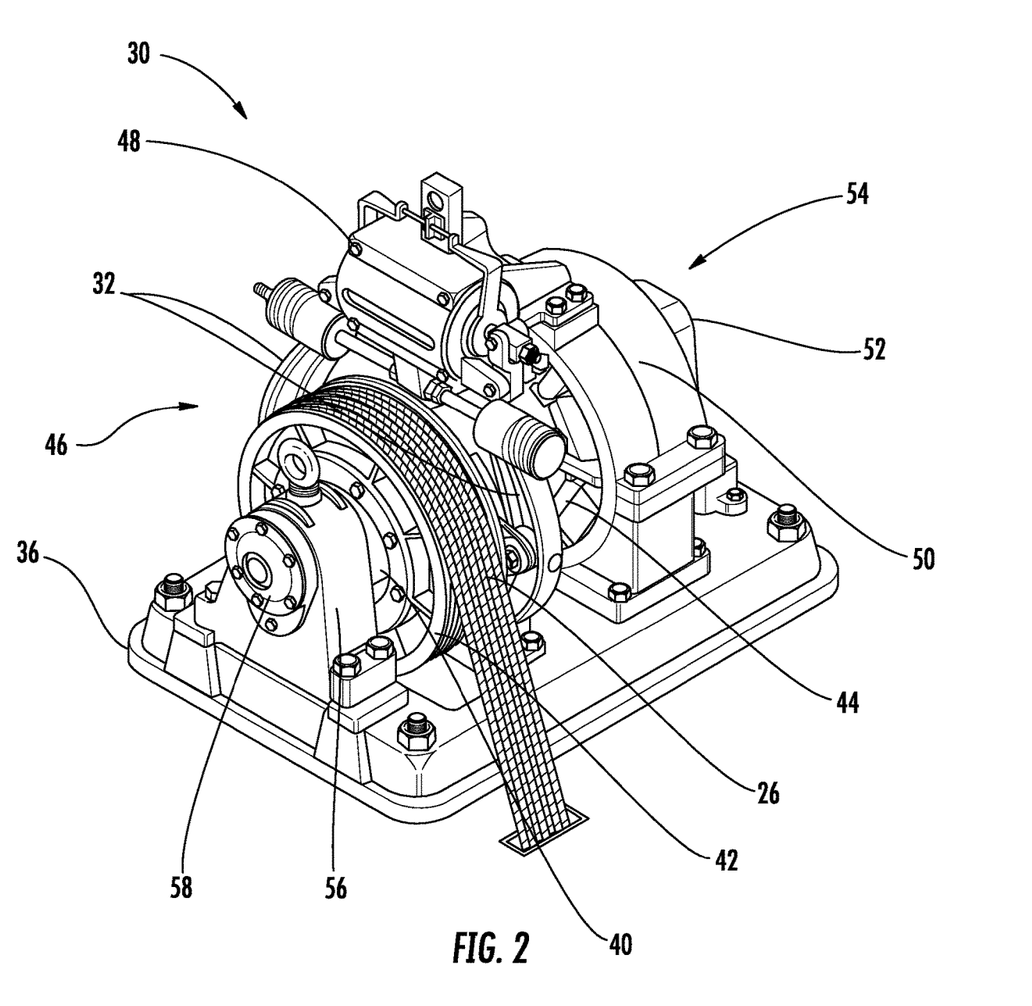
FIG. 2 illustrates an exemplary elevator machine.
Figure 3:
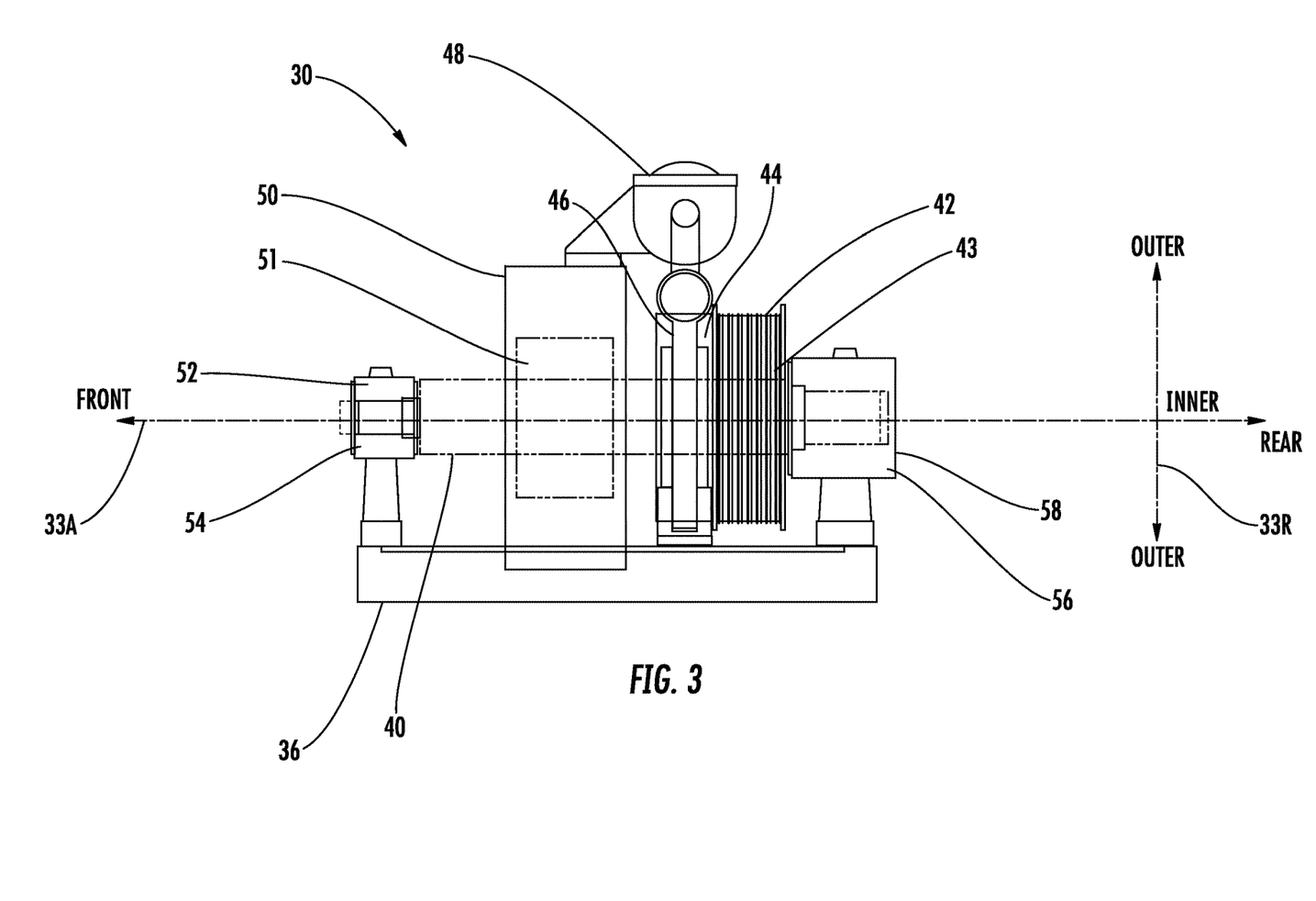
FIG. 3 illustrates another exemplary elevator machine.

An elevator machine 30, illustrated in greater detail in FIGS. 2-3, causes desired movement of the elevator car 22 to provide elevator service. The elevator machine 30, which could be a traction elevator machine, is supported on a machine frame, or bed plate 36 within a machine room 38. The elevator machine 30 includes a shaft 40, a drive sheave 42 on a sheave flange 43 (FIG. 3), and the sheave 42 drives the ropes 26 (FIG. 2). Integral with the drive sheave 42 is a brake drum 44. A brake arm assembly 46, with brake shoe (not illustrated), and brake arms 32 applies braking forces to the brake drum 44. A brake magnet housing 48 is provided as a part of the brake system, operatively connected to the brake arms 32.

As illustrated in FIG. 3, the elevator machine 30 includes a motor field frame 50 housing a motor rotating element 51, a front bearing stand 52, with a front bearing cover 54. On the rear of the elevator machine 30, there is a rear bearing stand 56 with a first rear bearing cover plate 58.

Figure 4:
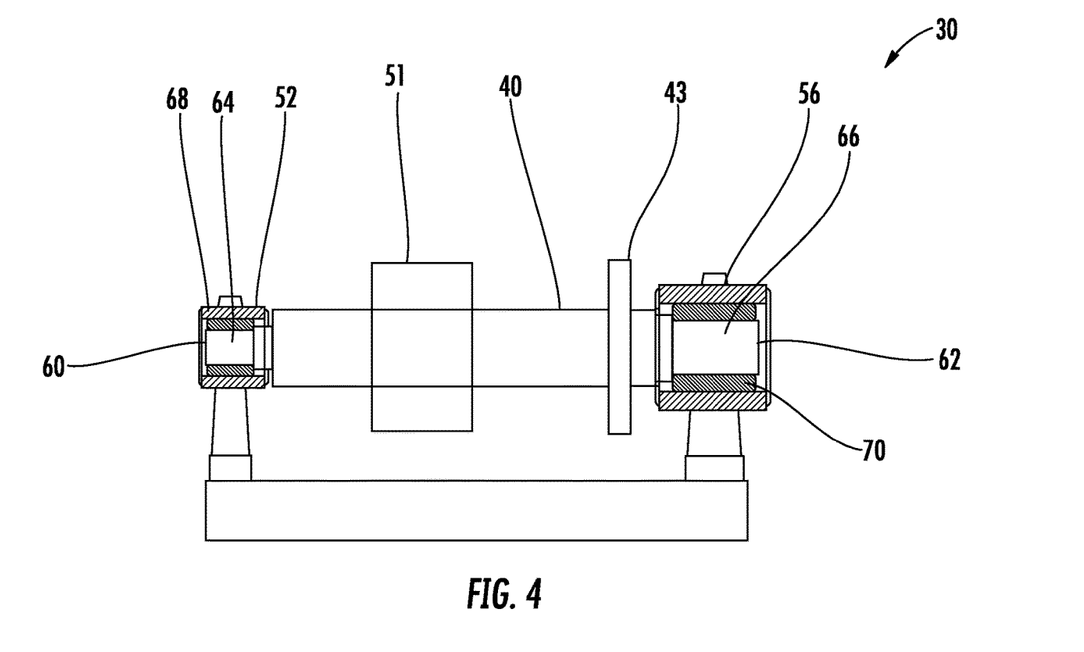
FIG. 4 illustrates another view of the elevator machine of FIG. 3, wherein components of the elevator machine unaffected by the disclosed embodiments are removed for visual clarity.

Within the front and rear bearing stands 52, 56, as illustrated in FIG. 4, is a front portion 60 of the motor shaft 40 and a rear portion 62 of the motor shaft 40. Rotationally supporting the respective front and rear portions 60, 62 of the motor shaft 40 is a front motor shaft bearing journal 64 and a rear motor shaft bearing journal 66. The bearing journals 64, 66 are positionally supported by a front sleeve bearing 68 and a rear sleeve bearing 70.

Figure 5:
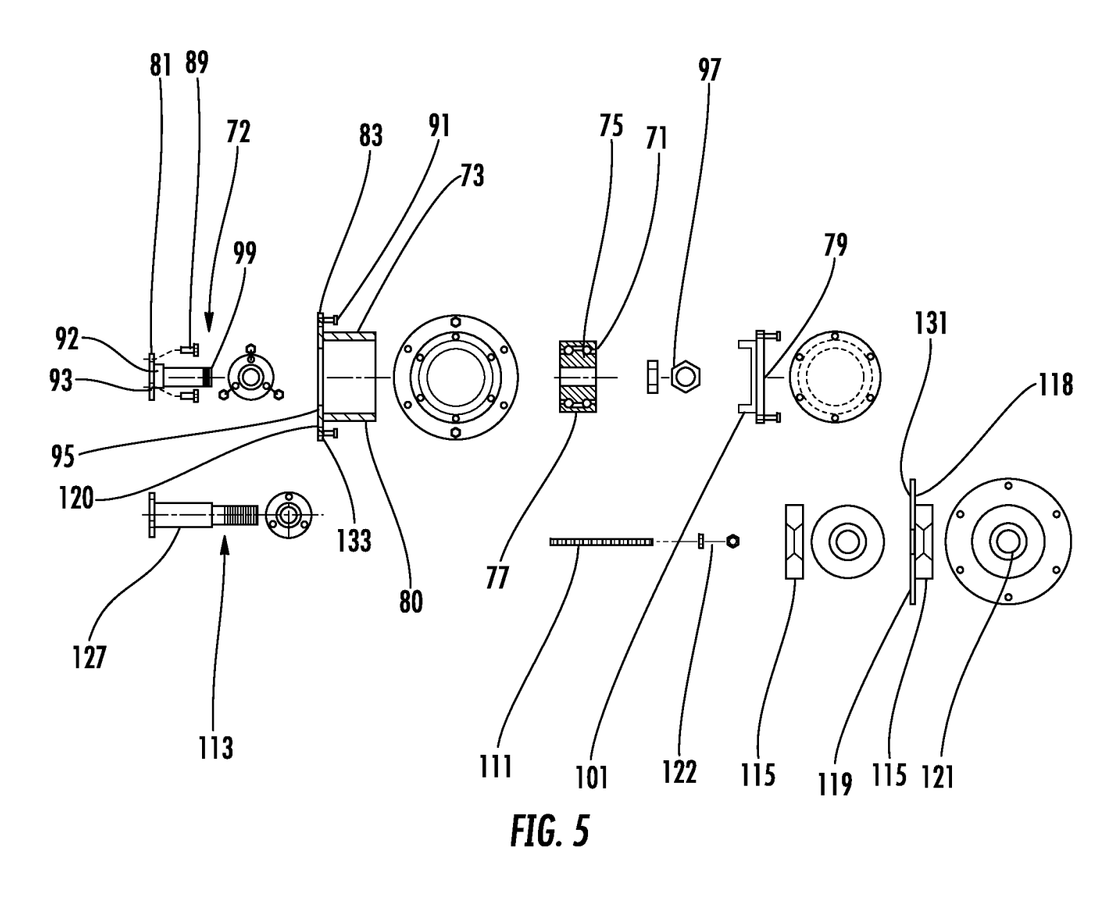
FIG. 5 illustrates a kit according to a disclosed embodiment.
Figure 6:
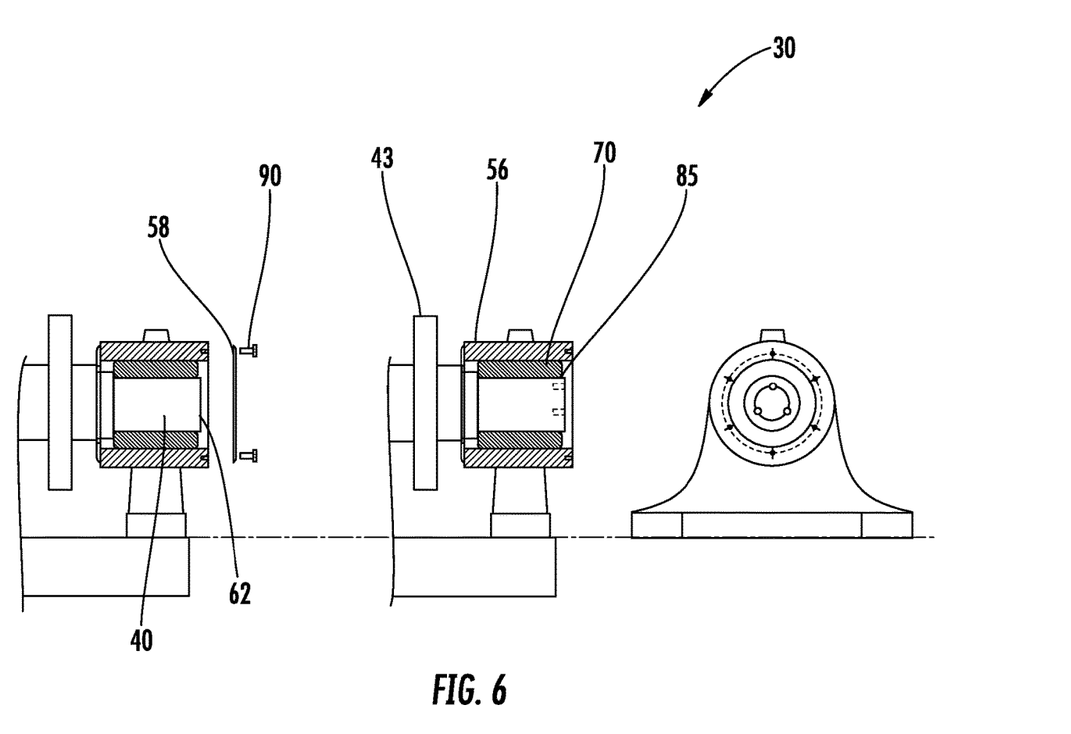
FIG. 6 illustrates the elevator machine of FIG. 3, partially modified according to a disclosed embodiment to receive the kit of FIG. 5.
Figure 7:
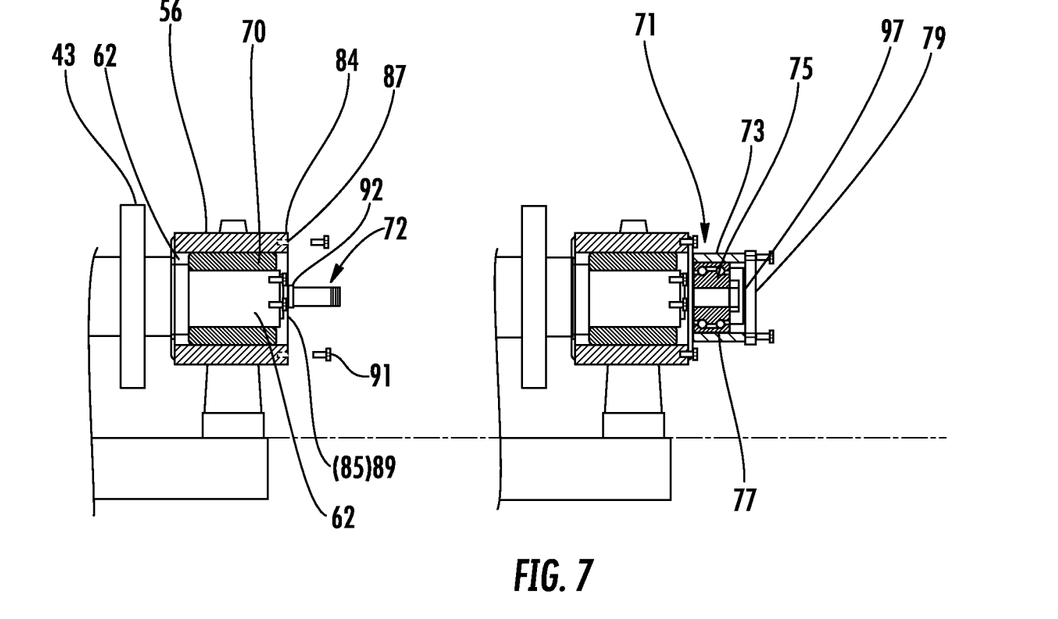
FIG. 7 illustrates the elevator machine of FIG. 4, further modified by utilizing components of the kit of FIG. 5, according to a disclosed embodiment.

Turning to FIGS. 5-7, illustrated are components, which can be provided in a kit, and a method for retrofitting the elevator machine 30 with a thrust bearing 71. In view of tight tolerances associated with certain componentry, including for example disc brakes, the disclosed method provides a system that limits front to back motion of the elevator machinery disposed between the bearing stands 52, 56.

The method includes removing, from the rear bearing stand 56, the rear cover plate 58 (FIG. 6) connected by bolts 90, providing access to the rear portion 62 of the motor shaft 40. The method includes securing an extension shaft 72 (FIGS. 5, 7) against the rear portion 62 of the motor shaft 40 (FIG. 7), and securing a thrust bearing housing 73 against the rear bearing stand 56 (FIG. 7). The method further includes positioning the thrust bearing 71 in the thrust bearing housing 73.

According to a disclosed embodiment, an inner race 75 (FIGS. 5, 7) of the thrust bearing 71 fits against the extension shaft 72. An outer race 77 of the thrust bearing 71 fits against the inside of the radially outer structure of the thrust bearing housing 73.

The method also includes securing a second rear outer cover plate 79 (FIG. 7) to the rear portion 80 of the thrust bearing housing 73.

As illustrated in FIG. 5, the extension shaft 72 includes a first front base plate 81, secured to the rear portion 62 of the motor shaft 40. The thrust bearing housing 73 includes a second front base plate 83, secured to the rear portion of the bearing stand 56.

The rear portion 62 of the motor shaft and the rear portion 84 of the bearing stand 56 are provided with threaded bores 85, 87 to apply a first bolt 89 (FIGS. 5, 7) and a second bolt 91. Alternatively, bolts 90 can be reused in the holes already the bearing stand 56 (FIG. 6). The bolts 89, 91 securely position the first base plate 81 of the extension shaft 72 and second base plate 83 of the thrust bearing housing 73. In one embodiment, the first bolt 89 and the second bolt 91 are each sets of bolts, such as three bolts per set, to provide the secured connection.

A shaft shoulder 92 on an outward extending portion 93 (FIG. 5) of the first base plate 81, having a larger diameter than the extension shaft 72, is a first bearing front seat for limiting axial forward motion of the thrust bearing inner race 75. The shoulder 92 has an axial length that enables the inner race 75 to flush mount with the front of the outer race 77. On the other hand, an inward extending portion 95 of the second base plate 83 is a second bearing front seat for limiting axial forward motion of the thrust bearing outer race 77.

A retaining nut 97 secured to a rear portion 99 of the extension shaft 72 is a first bearing rear seat for limiting rearward motion of the thrust bearing inner race 75. The second outer cover plate 79 has a forward extending annular boss 101, which is a second bearing rear seat for limiting rearward motion of the thrust bearing outer race 77.

As illustrated in FIG. 7, the second outer cover plate 79, including the annular boss 101 (FIG. 5), are spaced from the threaded rear portion 99 of the extension shaft 72 and retaining nut 97. This configuration provides buffer spacing as may be needed due to allowable forward and rearward motion of the elevator machine 30.

Figure 8:
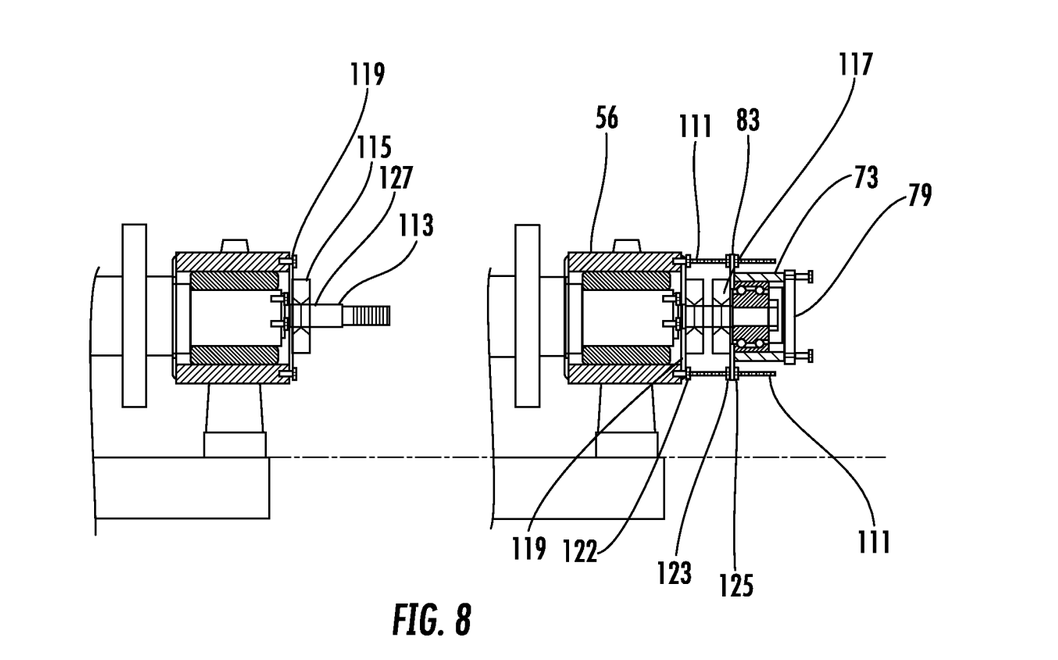
FIG. 8 illustrates the elevator machine of FIG. 4, modified according to an alternative embodiment, by utilizing various alternative components of the kit of FIG. 5.

An alternative embodiment is illustrated by additional kit components in FIG. 5 and the installed components in FIG. 8. As compared with the embodiment in FIG. 7, the embodiment in FIG. 8 illustrates the thrust bearing housing 73 mounted rearwardly offset from the rear bearing stand 56. The offset is provided via threaded extension rods 111 in place of screws 91 (FIG. 7), a relatively longer extension shaft 113, and oil seals 115, 117 added to retain lubricant in the bearing stand 56 and the thrust bearing housing 73.

A rear bearing cover plate 119, which is a third outer cover plate, has a center hole 121 for the extension shaft 113 to pass through. FIG. 5 illustrates a rear surface 118 of the bearing cover plate 119 with oil seal 115 mounted thereto. FIG. 8 illustrates the thrust bearing housing 73 with oil seal 117 mounted to a front surface 120 (FIG. 5) of the base plate 83. The extension shaft 113 is long enough to provide an axial gap between the oil seals 115, 117, providing spacing for adjusting the tilt and alignment of the thrust bearing housing 73 as required.

As illustrated in FIG. 8, axially stabilizing rear bearing cover plate 119 and the base plate 83 (FIG. 5) of the thrust bearing housing 73, are securing members 122, 123, 125. The securing members 122, 123, 125 are disposed on the front facing 131 surface of the bearing cover plate 119 and on front 120 and rear 133 facing surfaces of the base plate 83 (FIG. 5). As illustrated in FIG. 5, these securing members are threaded nuts. For axial stabilization of the bearing inner race 75, a shoulder 127 on the extension shaft 113 is provided, which is long enough to serve the same purpose of the shoulder 92 in the embodiment of FIG. 5.

Further within the scope of the disclosed embodiments is a standalone kit containing the components for retrofitting the thrust bearing 71 to the elevator machine 30, and an elevator machine 30 retrofitted to include a thrust bearing 71. Such embodiments would have the same components as identified in the method for installing the thrust bearing 71 and would provide the same benefits, i.e., a system that limits axial motion of the elevator machinery disposed between the bearing stands 52, 56.

As referenced above and illustrated in FIG. 3, the terms "front", "forward", "rear" and "rearward", with and without "end" or "portion", which are implicit where reasonable, are relative to the longitudinal axis 33A for the elevator machine. The terms "inner", "inward", "outer" and "outward", also with and without "end" or "portion", which are implicit where reasonable, are relative to the radial axis 33R for the elevator machine.

It is to be appreciated that "front" and "rear", with respect to, e.g., the installation of the thrust bearing kit, are reversible orientations, depending on installation needs. Those skilled in the art having the benefit of this description will realize that a variety of thrust bearing 71 configurations could be used that are different than the illustrated example. The techniques associated with the example retrofitting procedure may be used in a variety of elevator system configurations to retrofit a previously installed elevator machine 30 with a thrust bearing 71.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

We claim:

1. An elevator machine retrofitted with a thrust bearing, comprising:
    a bearing stand;
    a sleeve bearing supported in the bearing stand;
    a motor shaft supported by the sleeve bearing, an end portion of the motor shaft being accessible through the sleeve bearing;
    an extension shaft secured against the end portion of the motor shaft, the extension shaft extending in an axial rearward direction from the motor shaft;
    a base plate secured against, or axially offset from, an axial end of the bearing stand;
    a thrust bearing housing disposed axially against and extending axially in the axial rearward direction from the base plate, the extension shaft extending axially in the axial rearward direction through the base plate and the thrust bearing housing,
    the thrust bearing positioned in the thrust bearing housing, wherein:
        an inner race of the thrust bearing is securely positioned radially against, and axially fixed to, the extension shaft; and
        an outer race of the thrust bearing is securely positioned radially against the thrust bearing housing;
    a retaining nut secured to an end portion of the extension shaft, limiting axial motion, in the axial rearward direction, of the thrust bearing inner race; and
    a cover plate secured against an axial end of the thrust bearing housing, axially spaced apart, in the axial rearward direction, from the thrust bearing, the extension shaft and the retaining nut.

2. The elevator machine of claim 1, wherein:
    the extension shaft includes another base plate that is secured to the end portion of the motor shaft; and
    the thrust bearing housing includes the base plate that is secured against, or axially offset from, the bearing stand.

3. The elevator machine of claim 2, wherein the end portion of the motor shaft and bearing stand include threaded bores to securely position the base plates.

4. The elevator machine of claim 3, wherein:
    an outward extending portion of the other base plate includes a shoulder that is a first bearing seat for limiting axial motion of the thrust bearing inner race; and
    an inward extending portion of the base plate is a second bearing seat for limiting axial motion of the thrust bearing outer race.

5. The elevator machine of claim 4, wherein:
    the retaining nut, secured to the end portion of the extension shaft, is a third bearing seat for limiting axial motion of the thrust bearing inner race; and
    the second cover plate has an annular boss, which is a fourth bearing seat for limiting axial motion of the thrust bearing outer race.

6. The elevator machine of claim 5, wherein the second cover plate, which includes the annular boss, is axially spaced from the end portion of the extension shaft.

7. The elevator machine of claim 1, including a third cover plate, with a first oil seal secured thereto, secured against the bearing stand, and wherein, the thrust bearing housing includes a second oil seal secured thereto, and the thrust bearing housing is axially offset from the bearing stand with extension rods.

* * * * *